Oct. 27, 1964   S. C. SALYER   3,154,291
MILLWRIGHT'S EQUIPMENT-ALIGNING JACK
Filed April 8, 1963

Sidney C. Salyer
Inventor

By John Walker
Agent

United States Patent Office 3,154,291
Patented Oct. 27, 1964

3,154,291
MILLWRIGHT'S EQUIPMENT-ALIGNING JACK
Sidney C. Salyer, 716 San Miguel Road, Concord, Calif.
Filed Apr. 8, 1963, Ser. No. 271,372
2 Claims. (Cl. 254—102)

This invention relates to jacking devices, and more particularly to a positioning device especially adapted to the alignment of relatively heavy machine units.

During the assembly and installation of in-line equipment, comprising large and consequently heavy units such as motors, generators, compressors, gear stands, roll stands and the like, it is essential that the completed installation is such that all mechanically connected units are in perfect alignment. This is extremely important as any misalignment will cause maloperation of the units affected, resulting in undue stresses with a consequent waste of power and abnormal wear which means lowered efficiency and shorter operating life.

The usual procedure followed in the installation of heavy machinery is to lower the bedplates of the individual units into position onto prepoured and prelocated concrete foundations by means of an overhead crane. When feasible, a completely assembled unit may be placed in position in a similar manner. After being so placed, the various units are individually manipulated to bring them into common alignment with a predetermined axis at a selected elevation, and a fixed location relative to the column lines of the building in which they are housed, or some other fixed reference point. Allowance is made for such manipulation by finishing the surfaces of the various foundation pads at a slightly lower level than the calculated elevation of the under or bearing faces of the respective bedplates which are to rest thereon. By this means, vertical adjustment is provided for. Horizontal adjustment is made possible by the provision of anchor bolts in the foundations, which are of such a diameter that a small amount of movement of a unit can be made in any direction.

After the units have been placed by the crane in their approximate locations, wedges or packing blocks and shims being used under the bedplates to bring them to a close approach to the finished elevation, each unit is individually aligned by the use of jacking equipment. In the final stages of installation, readings are taken at the mating flanges of the various couplings connecting the adjacent pieces of machinery. These readings are made by means of thickness gauges, spirit levels and dial indicators, and at this stage of the work, are quite critical, and are indicative of the precise nature and the minute degree of the final adjustments.

It will be apparent from the foregoing that any jacking or positioning equipment used in the final placing of heavy pieces of machinery must be sufficiently rigid as to ensure positive and controlled movement of such machinery, and must also be capable of effecting such movement in a manner which can be controlled and limited to a very precise degree. Devices such as hydraulic jacks, which sometimes have a tendency to build up to a pressure in excess of that necessary to effect the movement of a heavy unit, are not entirely satisfactory. Their use often results in an uncontrolled movement of a unit beyond the desired point of final location. Other equipment such as conventional screw jacks, wedges, crow bars and the like, do not provide the means for precise adjustment that is so essential to expeditious and accurate alignment.

The present invention is primarily directed to the accurate and expeditious placing of units as described, in their desired locations, by adjustments on a horizontal plane. During this phase of the alignment operations, no extreme forces are necessary, the units generally being caused to slide relatively freely without any great effort having to be exerted. By virtue of the relatively small size and light weight of my device, one or more of these jacks can be quickly set into place, generally lying in a horizontal plane and being held thus, between some fixed object and the unit to be aligned by the compressive force of the initial adjustment, and the self locking feature of the device. Minute and precise adjustments can then be effected as will be apparent from the following description. Adjustments in the vertical direction, which involve the supporting of the entire weight of a unit being aligned, will of course be made by the use of equipment more suited to this purpose.

It is the principal object of the present invention to provide a jacking device that is adapted to precise and minutes degrees of adjustment.

It is a further object of the invention to provide a device of the kind described that can be preliminarily adjusted in a relatively short space of time, in order to minimize the extent of the final precise adjustment.

These and other advantages of the invention will become apparent during the course of the following description and appended claims, taken in connection with the accompanying drawing forming a part hereof.

Figure 1:
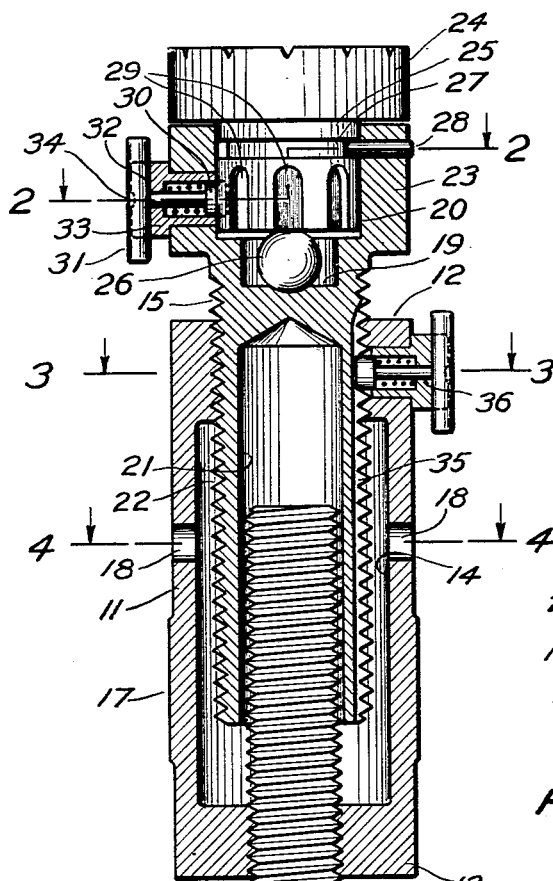
FIG. 1 is a vertical cross section taken on the longitudinal axis of a preferred embodiment of the invention.

Referring to the drawing in detail, a tubular member or sleeve 11 is provided having an internal flange at each end thereof. These flanges are annular in configuration, and have concentric, threaded apertures of different sizes. Flange 12 is provided with a threaded opening somewhat larger in diameter than that of flange 13. The pitch of each of the two internal threads is also different, that of flange 12 being greater than that of flange 13, although the reverse condition can be used if desired. The depth or thickness of the individual flanges is such that adequate bearing is provided for the reception of the screws for which they are adapted. The inner portion of the sleeve 11, intermediate the flanges 12 and 13, is recessed to provide clearance for the reception of a pair of internal screw members 15 and 16, the word internal being used in the sense that the screw members are substantially contained within the sleeve 11. The exterior of the sleeve 11, while being generally cylindrical in shape, may be provided with a hexagonal portion 17 for use with a wrench, and a plurality of peripherally spaced apertures 18 may also be provided to enable the sleeve to be rotated by means of a spanner wrench.

The screw member 15, which is adapted to engage the threaded aperture of the flange 12, is also of tubular construction except for a relatively short interior portion 19 which is adapted to take any thrust which may be imposed upon the device during its use. This inner portion 19, which is located adjacent the outer end of the screw member 15, as illustrated on FIG. 1, forms the bottom of a concentric recess 20 in the end of the screw, and also terminates the interior bore 21 of the tubular portion of said screw. The exterior of the screw member 15 comprises a relatively long threaded portion 22 having a flanged head 23 at its outer end. The head 23 is concentric with, and forms an annular wall for the recess 20.

A relatively short cylindrical member 24, having a concentric boss 25 extending from one end thereof, is adapted to form the thrust head for the screw member 15, the boss 25 being received within the recess 20, as illustrated. A steel ball 26 is interposed between the confronting faces of the boss 25 and the portion 19 of the screw member 15. A concentric groove 27, located near the upper portion of the boss 25, is provided for the reception of a pin 28, which extends through the concentric wall of the flanged head 23, and maintains the thrust head in position.

Figure 2:
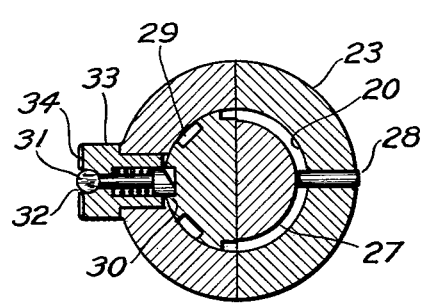
FIG. 2 is a horizontal, transverse section taken on line 2—2 of FIG. 1.
Figure 3:
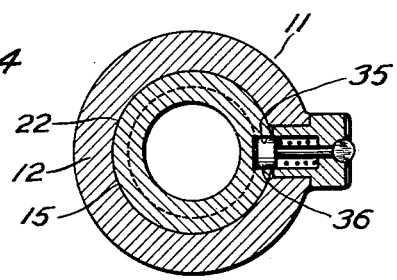
FIG. 3 is a horizontal, transverse section taken on line 3—3 of FIG. 1.
Figure 4:
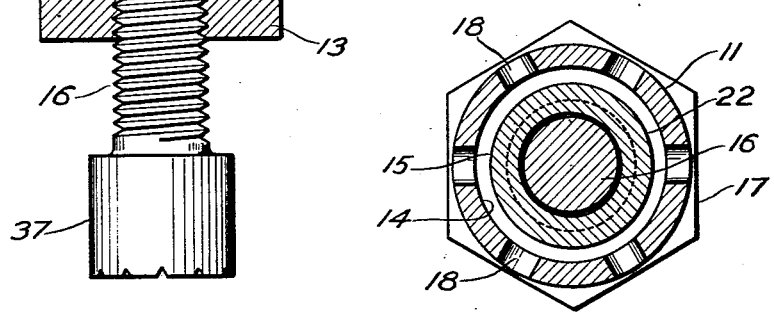
FIG. 4 is a horizontal, transverse section taken on line 4—4 of FIG. 1.

The boss 25 is splined as indicated at 29 on FIGS. 1 and 2, these splines being provided for the reception of a reciprocal, retractile pawl member 30. The pawl member may be set as indicated on FIG. 2, in pawl and ratchet relationship with the splines 29, permitting rotation of the screw around the thrust head 24 in a clockwise direction relative to said figure; it may be set for reverse direction by disengaging its handle 31 from a relatively deep receiving groove 32 in its mounting sleeve 33, and then rotating the handle through 180 degrees and reseating it in the groove. The pawl may also be entirely disengaged by seating the handle 31 in a relatively narrow groove 34, extending across the face of the mounting sleeve 33, and being oriented normal to the deeper groove 32.

As illustrated at 35 on FIG. 1, the screw member 15 is provided with a spline which extends for substanially the entire length of the threaded portion thereof. This spline is adapted to be engaged by a retractile locking pin 36, mounted as shown through the wall of the flange 12, adjacent the upper end of the sleeve 11. This locking pin can be set for either engagement with the spline 35 or disengagement therefrom, in substantially the same manner as heretofore described for pawl member 30.

The screw member 16, which is adapted to be engaged by, and operate in constricting relationship with the threaded aperture of flange 13, and extends into the hollow portion 21 of the screw member 15, is threaded for its entire length of body, and is provided at its outer end with a suitably shaped thrust head portion 37, as illustrated.

As heretofore stated, the screw threads of the members 15 and 16 are of different pitch or lead, they are, however, both of the same hand, and when simultaneously restricted from rotating, turning of the sleeve 11 will coact with the screw members in synergistic relationship and thus effect a change in the overall length of the device in the manner well known for differential screw operation. The overall length of the jack will be increased or decreased according to the direction of rotation of the sleeve 11, and the amount of change per revolution of the sleeve will be the difference in the amount of lead of the two screws. The larger pitch screw operates to increase the change, while the smaller pitch screw effects a decrease in the change.

Additional screw members 16, of different lengths, can be provided to suit various conditions. It should also be apparent that my device can be permanently mounted and utilized for such purposes as cutter setting means for machine tool operation, and may also be incorporated in the design of measuring instruments such as micrometers.

The actual operation of the device comprises the following steps: With both of the screw members advanced all of the way into the sleeve, the correct length of the smaller screw having been selected for the particular operation, the jack is adjusted by unscrewing the smaller screw as far as possible while still maintaining the overall length to such an amount as will permit its placement in the operating position. With the locking pin engaged and the ratchet pawl disengaged, the device may then be operated as a conventional screw jack, and an initial positioning of a machine unit can be expeditiously effected. The final and precise adjustment can then be made by releasing the locking pin and engaging the pawl to permit rotation of the sleeve in the direction reverse to that of the initial operation. The provision of the ratchet prevents inadvertent displacing of the jacking device which could occur as a result of turning the sleeve in the wrong direction.

From the foregoing it will be apparent that I have provided a device as described that has great utility in the field of machinery installation, and the precise positioning of machine units in general, and while I have disclosed a preferred embodiment of my invention, it should be understood that further modifications may be made within the spirit and scope of the appended claims.

I claim:

1. A differential screw jack comprising a tubular member having an internally threaded annular flange at one end thereof, a second internally threaded annular flange at the other end thereof, said flanges being in axially aligned and spaced relationship and being connected by an axially aligned and centrally located cylindrical sleeve to form an integral unit, the threaded apertures of said annular flanges being of a different diameter and a different pitch the one from the other, but being of the same hand, and said cylindrical sleeve having an internal diameter in excess of the external screw thread diameters of the apertures in said flanges; a screw member mounted in thread engaging relationship with the one of said flanges having the smaller threaded aperture, and having a thrust head at its outer end, a second screw member mounted in thread engaging relationship with the one of said flanges having the larger threaded aperture, and also having a thrust head at its outer end, the second of said screw members being open at its inner end and being of tubular construction for a substantial portion of its length, the inside diameter of the tubular portion of said second screw member being in excess of the outside diameter of the first mentioned screw member whereby telescopic relationship of said screw members can be effected, and means adapted to lock said tubular member and said second screw member against rotation relative to each other.

2. A differential screw jack as in claim 1 wherein the thrust head of said second screw member is rotatably mounted thereon and adjustable and disengageable ratchet means adapted to effect the selective simultaneous direction of rotation of said thrust head and said second screw member.

References Cited in the file of this patent

UNITED STATES PATENTS

| | | |
|---|---|---|
| 115,086 | Morrison | May 23, 1871 |
| 531,785 | Didier | Jan. 1, 1895 |
| 645,810 | Hennessy | Mar. 20, 1900 |
| 796,204 | Goodwin | Aug. 1, 1905 |
| 861,373 | Lewis | July 30, 1907 |
| 1,154,519 | Lansdowne | Sept. 21, 1915 |
| 1,192,611 | Field | July 25, 1916 |
| 2,485,280 | Grace | Oct. 18, 1949 |